United States Patent
Koch et al.

(10) Patent No.: US 11,629,784 B2
(45) Date of Patent: Apr. 18, 2023

(54) SEALING RING AND USE THEREOF

(71) Applicant: Carl Freudenberg KG, Weinheim (DE)

(72) Inventors: Andreas Koch, Hamburg (DE); Thomas Segbers, Asendorf (DE); Jan Fritz, Hamburg (DE); Mirko Minners, Hamburg (DE); Stefan Scheffler, Seevetal (DE); Akio Shimizu, Hamburg (DE)

(73) Assignee: CARL FREUDENBERG KG, Weinheim (DE)

( * ) Notice: Subject to any disclaimer, the term of this patent is extended or adjusted under 35 U.S.C. 154(b) by 93 days.

(21) Appl. No.: 17/186,001

(22) Filed: Feb. 26, 2021

(65) Prior Publication Data
US 2021/0270372 A1 Sep. 2, 2021

(30) Foreign Application Priority Data
Feb. 27, 2020 (DE) .................... 10 2020 105 149.2

(51) Int. Cl.
*F16J 15/3204* (2016.01)

(52) U.S. Cl.
CPC ................................. *F16J 15/3204* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3212; F16J 15/3216; F16J 15/322; F16J 15/3228; F16J 15/3232

USPC ......................................................... 277/549
See application file for complete search history.

(56) References Cited

U.S. PATENT DOCUMENTS

| | | | |
|---|---|---|---|
| 9,182,041 B2 * | 11/2015 | Daub | .................. F16J 15/3236 |
| 2016/0053894 A1 | 2/2016 | Mueller-Niehuus | |
| 2018/0080562 A1 | 3/2018 | Mueller-Niehuus | |
| 2020/0124178 A1 | 4/2020 | Hamamoto et al. | |
| 2021/0018099 A1 | 1/2021 | Manaka | |

FOREIGN PATENT DOCUMENTS

| | | | |
|---|---|---|---|
| CN | 201078474 Y | | 6/2008 |
| CN | 206234363 U | | 6/2017 |
| CN | 206234363 U | * | 6/2017 |
| CN | 206246541 U | | 6/2017 |
| DE | 102009053558 A1 | | 5/2011 |
| DE | 102016215042 A1 | | 4/2017 |
| DE | 102016011448 A1 | | 3/2018 |
| EP | 2988035 A1 | | 2/2016 |
| JP | 2003343736 A | | 12/2003 |
| JP | 2010261598 A | | 11/2010 |
| JP | 2017207107 A | * | 11/2017 |
| JP | 2019095052 A | | 6/2019 |
| WO | WO 2003069177 A1 | | 8/2003 |

(Continued)

*Primary Examiner* — Nathan Cumar
(74) *Attorney, Agent, or Firm* — Leydig, Voit & Mayer, LTD.

(57) ABSTRACT

A sealing ring includes: a first axial leg; and a sealing leg with a sealing lip. When viewed in cross section, the sealing ring is in a shape of a seven. The sealing leg is connected to a first end face of the first axial leg by a first joint. The sealing leg has, on a side facing axially toward the first end face, a dirt lip with at least one sealing edge and a radially internal first boundary surface and a radially external second boundary surface.

11 Claims, 1 Drawing Sheet

(56) References Cited

FOREIGN PATENT DOCUMENTS

| WO | WO-2017099009 A1 | * | 6/2017 | ............... B62D 5/06 |
| WO | WO-2017221653 A1 | * | 12/2017 | ........... F16J 15/3204 |
| WO | WO 2019004141 A1 | | 1/2019 | |
| WO | WO 2019239891 A1 | | 12/2019 | |

\* cited by examiner

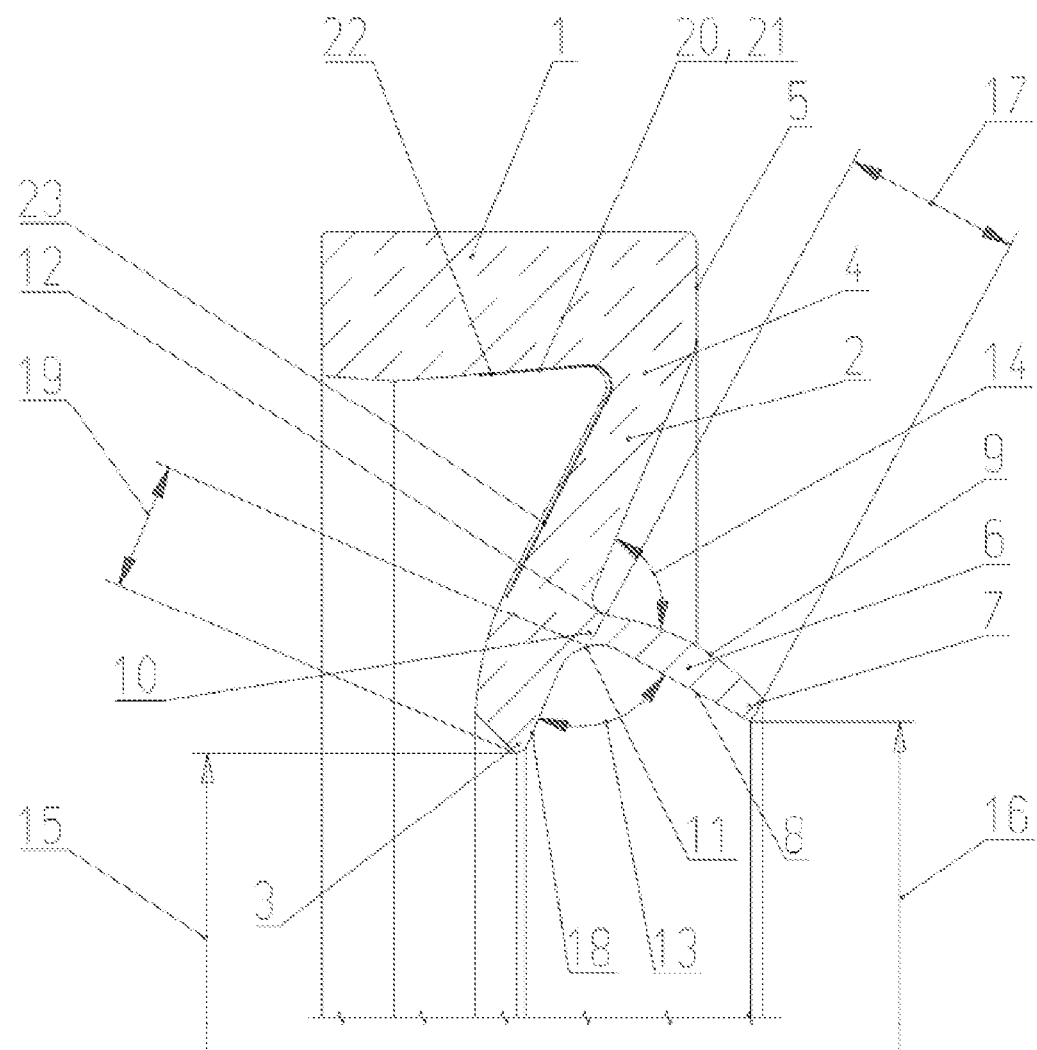

SEALING RING AND USE THEREOF

CROSS-REFERENCE TO PRIOR APPLICATION

Priority is claimed to German Patent Application No. DE 10 2020 105 149.2, filed on Feb. 27, 2020, the entire disclosure of which is hereby incorporated by reference herein.

FIELD

The invention relates to a sealing ring and to the use thereof, wherein the sealing ring, when viewed in cross section, is in the shape of a seven, comprising a first axial leg and a sealing leg with a sealing lip, wherein the sealing leg is connected to a first end face of the axial leg by means of a joint.

BACKGROUND

Such a sealing ring and use thereof are known from DE 10 2016 011 448 A1.

Moreover, the sealing ring has a tensioning element for stabilizing the sealing leg in the radial direction. The tensioning element is annular and, when viewed in cross section, is formed by a spring in the shape of a seven. The tensioning element has a second axial leg and a stabilizing leg, wherein the second axial leg is connected to the first axial leg and the stabilizing leg is connected to the sealing leg.

The previously known sealing ring has improved performance characteristics during a longer service life, irrespective of the size of the diameter to be sealed. Independent of the installation situation of the sealing ring, the sealing lip always makes sealing contact with a surface to be sealed of a machine element to be sealed with a constant radial prestress during a long service life. By means of the tensioning element, it is irrelevant to the good performance characteristics whether the sealing leg is arranged with its sealing lip radially inside the sealing ring or radially outside the sealing ring.

A further sealing ring comprising a tensioning element for stabilizing the sealing leg in the radial direction is known from EP 2 988 035 A1.

The previously known sealing ring is used for sealing lubricating grease and comprises a tensioning element arranged in an installation groove of the sealing ring. The installation groove is arranged on the side of the sealing leg facing away radially from the sealing lip, wherein the installation groove has an installation opening for the tensioning element on the side facing away radially from the sealing lip, said opening being delimited by two guide webs arranged adjacently at a distance from one another in the axial direction. The joint, when viewed in the radial direction and in the production-related state of the sealing ring, is arranged in the middle of the sealing ring. Also arranged in the radial direction in the middle of the sealing ring in the region of the joint is a substantially C-shaped joint space which is open on one side in the axial direction.

This joint space is designed in such a way that therein located medium to be sealed is discharged therefrom. Due to the fact that no medium to be sealed is retained within the joint space, undesired hardening of the sealing ring is prevented, and the sealing leg is able to follow high dynamic deflection movements of a machine element to be sealed without the pressing forces, with which the sealing lip makes sealing contact with the machine element to be sealed, changing appreciably.

Another sealing ring of the type mentioned at the outset is known from DE 10 2009 053 558 A1. The sealing ring is in the shape of a seven and comprises a first axial leg, which is comparatively thick in the radial direction, and a sealing leg with a sealing lip, wherein the sealing leg is connected to a first end face of the axial leg by means of a joint. By way of contrast, a separately produced tensioning element for stabilizing the sealing leg in the radial direction is not provided. The joint, when viewed in the radial direction and in the production-related state of the sealing ring, is arranged in the middle of the sealing ring. The two end faces of the axial leg are designed with elevations and supported by means of these elevations in an installation space of a sealing arrangement, wherein the elevations prevent a twisting/tilting of the sealing ring in the installation space during its intended use. The elevations can be designed as circumferentially peripheral self-contained beads, by means of which a particularly good clamping effect of the axial leg in the installation space results.

None of the aforementioned sealing rings have any means which would prevent contaminants from the environment of the sealing ring from disadvantageously penetrating up to the sealing lip.

SUMMARY

In an embodiment, the present invention provides a sealing ring, comprising: a first axial leg; and a sealing leg with a sealing lip, wherein, when viewed in cross section, the sealing ring is in a shape of a seven, wherein the sealing leg is connected to a first end face of the first axial leg by a first joint, wherein the sealing leg has, on a side facing axially toward the first end face, a dirt lip with at least one sealing edge and a radially internal first boundary surface and a radially external second boundary surface.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

The FIGURE shows a schematic view of an exemplary embodiment of a sealing ring according to the invention.

DETAILED DESCRIPTION

In an embodiment, the present invention further develops a sealing ring of the type mentioned at the outset in such a way that the sealing lip is better protected from contaminants from the environment of the sealing ring which reduce its service life. As a result, the sealing ring should have consistently good performance characteristics during a long service life. The risk of damage/destruction to the sealing lip should be minimized as a result.

Moreover, uses should be specified for which the sealing ring according to the invention is particularly suitable.

In order to accomplish the object, it is provided that the sealing leg has, on its side facing axially toward the first end face, a dirt lip with at least one sealing edge and a radially internal first boundary surface and a radially external second boundary surface.

By providing a dirt lip on the side of the sealing lip facing the environment of the sealing ring, the sealing lip is effectively protected from being subjected to contaminants. Especially when the sealing ring is used in a highly contaminated environment, the dirt lip which is connected upstream of the sealing lip in the direction of the environment in a functional series connection is of notable advantage. The contaminants are prevented by the dirt lip from penetrating up to the sealing lip. The sealing lip protected by the dirt lip thereby functions consistently well during a long service life.

The dirt lip can be hinged to the sealing leg by means of a second joint. This has the advantage that the sealing leg and the dirt lip are functionally coupled. If the sealing leg moves in the radial direction outward or inward during the intended use of the sealing ring, the dirt lip follows in a corresponding manner because it is hinged to the sealing leg by means of the second joint. As a result of the hinging of the dirt lip at the sealing leg, the dirt lip automatically follows the sealing leg over its entire radial working range without adversely affecting the function of the sealing lip on the sealing leg.

The second joint may have a radially internal joint radius and a radially external joint radius through which the dirt lip is designed to merge into the sealing leg.

More preferably, the internal joint radius is greater than the external one.

For most applications, it has proven to be advantageous for the ratio of internal joint radius to external joint radius to be at least 2.

Due to the different design of the joint radii, their individual function can be adapted independently of one another to the respective application. The radially internal joint radius predominantly influences the contact force with which the dirt lip abuttingly encloses the machine element to be sealed during the intended use of the sealing ring. The greater the joint radius, the stronger the contact force.

By way of contrast, the radially external joint radius influences the flexibility of the dirt lip in the radial direction. The greater the radius, the lower the flexibility of the dirt lip.

In the production-related state of the sealing ring, the sealing leg and the dirt lip can delimit a substantially right angle radially internally and radially externally. Such a design achieves a good compromise of a good sealing effect of the dirt seal on the one hand and an operation of the dirt lip on the machine element to be sealed with the lowest possible frictional losses on the other hand.

This also applies if, when viewed in the production-related state of the sealing ring in each case, the sealing lip has a first diameter and the sealing edge a second diameter, wherein the first diameter is smaller than the second diameter. During the intended use of the sealing ring, i.e., in its installed state in a sealing arrangement, the sealing lip encloses the machine element to be sealed with a comparatively greater radial prestress than the sealing edge.

The advantageous performance characteristics described above can be further facilitated in that the first boundary surface delimiting the right angle radially inside the dirt lip has a first length and a third boundary surface of the sealing leg has a third length deviating from the first length, wherein the first length is greater than the third length.

The sealing leg and the dirt lip are preferably formed such that they merge with each other in one piece and of one material and consist of a rubber-elastic sealing material. In this case, it is advantageous that the sealing ring has a simple construction with a small number of parts and can thus be produced simply and cost-effectively. Moreover, assembly is particularly simple as a result of the one-piece design; the risk of assembly-related faults during installation of the sealing ring is thereby kept to a minimum.

According to an advantageous embodiment, it can be provided that the second boundary surface is convexly formed along its extent. The convex geometry of the second boundary surface of the dirt lip is required in order to achieve a defined line contact of the sealing edge of the dirt lip. The radius of curvature of the convex boundary surface is selected such that surface contact of the dirt lip on a component to be sealed during the intended use of the sealing ring and associated diminished performance characteristics are reliably avoided.

On the side of the sealing leg facing away axially from the dirt lip, merging from the sealing leg into the first axial leg, a tensioning element can be arranged to stabilize the sealing leg in the radial direction.

As already stated at the outset, such a tensioning element is known from DE 10 2016 011 448 A1.

In the sealing ring according to the invention, the tensioning element can also be annular and, when viewed in cross section, formed by a spring in the shape of a seven. The tensioning element can have a second axial leg and a stabilizing leg, wherein the second axial leg is connected to the first axial leg and the stabilizing leg is connected to the sealing leg.

The tensioning element which has a shape corresponding to the shape of the entire sealing ring, namely the shape of a seven, brings about the advantageous performance characteristics of the sealing ring, irrespective of whether the sealing leg is arranged with its sealing lip radially inside the sealing ring or radially outside the sealing ring.

The tensioning element can be substantially isosceles.

The sealing ring from EP 2 988 035 A1 mentioned at the outset is mainly provided for radially internal sealing systems. The sealing leg and the sealing lip are arranged radially inside the sealing ring, wherein the sealing lip sealingly encloses a surface to be sealed of a machine element to be sealed, for example a shaft, under radial prestress.

For radially external sealing systems, when the axial leg is arranged radially on the inside and the sealing leg with its sealing lip extends radially outward starting from the axial leg, annular helical springs embodied as tensioning elements are disadvantageous. Annular helical springs are currently used as tension springs for internal sealing systems. In external sealing systems, such a spring would have to be designed as a compression spring. This is possible in principle but frequently makes assembly and reliable positioning of the spring in the installation space more difficult. The risk of popping out of the installation space is much higher in comparison with a tension spring.

By way of contrast, in the sealing ring according to the invention, a spring in the shape of a seven can be used as the tensioning element, the shape of which is adapted to the shape of the sealing ring. Such a sealing ring has the advantage that it can also be used well in external sealing systems in which the sealing leg with the sealing lip extends radially outward and, for example, makes sealing contact with a wall delimiting a housing bore.

The performance characteristics of the sealing ring are always equally good, irrespective of whether the sealing lip is arranged radially inside or radially outside the sealing ring. As a result of the shape of the spring described above, the radial spring force comes from the radial movement of the spring. In this case, it is immaterial to the use whether the system is an external or an internal sealing system. The sealing lip is pressed against a surface to be sealed by the bending of the spring and can thus be implemented regardless of diameter.

Comparatively large radial deflection movements of the machine element to be sealed can be well compensated by the spring in the shape of a seven, without the pressing force, with which the sealing lip makes sealing contact with the surface to be sealed, being changed appreciably.

Moreover, it is advantageous that the spring in the shape of a seven can be produced simply and cost-effectively. The integration of such a spring into a sealing ring is also easy.

According to an advantageous embodiment, it can be provided that the second axial leg is embedded in the first axial leg and the stabilizing leg is embedded in the sealing leg. In this case, it is advantageous that the spring forms an integral component of the sealing ring. An undesirable loss of the spring, both during the mounting of the sealing ring before its use as well as during the intended use in the installed state, can thereby be reliably avoided.

The second axial leg can be at least substantially enclosed by the first axial leg and the stabilizing leg by the sealing leg. In this case, it is advantageous that the positioning of the spring in the sealing ring is particularly reliable and durable. Despite the use of the spring, the sealing ring appears practically integral and the assembly effort of the sealing ring is thereby low. The risk of assembly errors is also kept to a minimum.

The use of the sealing ring described above in tunnel boring machines or wind turbines is particularly advantageous.

In general, it has proven advantageous with regard to the performance characteristics, in particular with regard to the performance characteristics of the sealing ring in radially external sealing systems, if the joint between the first axial leg and the sealing leg is arranged as far away as possible from the sealing lip in the radial direction. As a result, the sealing leg and likewise the dirt lip hinged to the sealing leg are able to follow radial deflection movements of a machine element to be sealed particularly well, even if these deflection movements in the radial direction are comparatively large. The size of the radial deflection movements is dependent on the diameter to be sealed. The diameters to be sealed in wind turbines can be, for example, 4 m, the diameter to be sealed in tunnel boring machines, for example, 18 m. By means of the first joint arranged in the radial direction as far away as possible from the sealing lip and the resulting good elastic resilience of the sealing leg and dirt lip, the sealing lip and the sealing edge make contact with the surface to be sealed, even in such a case, with a consistently good contact pressure and thereby sealing effect.

The dirt lip moves, together with the sealing leg to which it is hinged, jointly in the radial direction. The sealing lip of the sealing leg is thereby reliably protected from being subjected to contaminants.

The sealing ring described above can particularly preferably be used in tunnel boring machines, wind turbines or other radial applications with larger radial deflection movements.

An exemplary embodiment of the sealing ring according to the invention is shown in the FIGURE. When viewed in cross section, the sealing ring is in the shape of a seven and comprises the first axial leg 1 and the sealing leg 2 with the sealing lip 3. The sealing leg 2 is hinged to the first end face 5 of the first axial leg 1 by means of the joint 4.

On the side of the sealing leg 2 facing axially toward the first end face 5, the dirt lip 6 comprising the sealing edge 7 is arranged in the radially internal region of the sealing leg 2. The dirt lip 6 has the first boundary surface 8 radially on the inside and the second boundary surface 9 radially on the outside. The first boundary surface 8 is substantially flat, whereas the second boundary surface 9 is convex.

The sealing leg 2 and the dirt lip 6 are formed such that they merge with each other in one piece and of one material, consist of a rubber-elastic material and are elastically resiliently connected to one another by means of the second joint 10. The second joint 10 is formed by a radially internal joint radius 11 and a radially external joint radius 12, which are designed differently from one another. The internal joint radius 11 is greater than the external joint radius 12.

In the FIGURE, the sealing ring is shown in its production-related state, that is to say is not installed in a sealing arrangement. As shown here, the dirt lip 6 projects substantially perpendicularly from the sealing leg 2, wherein the first diameter 15 of the sealing lip 3 is smaller than the second diameter 16 of the sealing edge 7. The sealing leg 2 and the dirt lip 6 delimit the substantially right angles 13, 14.

The first boundary surface 8 delimiting the right angle 13 radially inside the dirt lip 6 has the first length 17. The third boundary surface 18 of the sealing leg 2 has the third length 19, which is different from the first length 17. The first length 17 is greater than the third length 19. The geometry of the dirt lip 6 shown, the geometry of the sealing leg 2 radially inside the second joint 10 and the hinging of the dirt lip 6 to the sealing leg 2 ensure that the dirt lip 6 forms an integral component of the sealing ring and moves with the sealing leg 2 jointly in the radial direction. The sealing lip 3 of the sealing leg 2 is protected by the dirt lip 6 from being subjected to contaminants from the environment of the sealing ring during the intended use of the sealing ring. The dirt lip 6 functions over the entire working range of the sealing ring without adversely affecting the function of the sealing lip 3.

Merging from the sealing leg 2 into the first axial leg 1, the tensioning element 20 is arranged on the side of the sealing leg 2 facing away axially from the dirt lip 6. The tensioning element 20 is provided for stabilizing the sealing leg 2 in the radial direction. The tensioning element 20 is formed by the spring 21 which, in the exemplary embodiment shown here, consists of a spring steel. The spring 21 comprises the second axial leg 22 and the stabilizing leg 23 which are each adapted to the shape of the first axial leg 1 and the sealing leg 2, that is to say are likewise in the shape of a seven.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 First axial leg
2 Sealing leg
3 Sealing lip of 2
4 First joint between 1 and 2
5 First end face of 1
6 Dirt lip
7 Sealing edge of 6
8 Radially internal first boundary surface of 6
9 Radially external second boundary surface of 6
10 Second joint between 2 and 6
11 Radially internal joint radius of 10
12 Radially external joint radius of 10
13 Right angle, radially internal
14 Right angle, radially external
15 First diameter of 3
16 Second diameter of 7
17 First length of 8
18 Third boundary surface of 2, radially internal of 6
19 Third length of 18
20 Tensioning element
21 Spring
22 Second axial leg of 21
23 Stabilizing leg of 21

What is claimed is:

1. A sealing ring, comprising:
   a first axial leg; and
   a sealing leg with a sealing lip,
   wherein, when viewed in cross section such that a radially outward direction extends from bottom to top, the sealing ring is in a shape of a seven,
   wherein the sealing leg is connected to a first end face of the first axial leg by a first joint,
   wherein the sealing leg has, on a side facing axially toward the first end face, a dirt lip with at least one sealing edge and a radially internal first boundary surface and a radially external second boundary surface,
   wherein the sealing leg and the dirt lip in a production-related state of the sealing ring delimit a substantially right angle radially internally and radially externally,
   wherein, in a production-related state of the sealing ring in each case, the sealing lip has a first diameter and the sealing edge has a second diameter, the first diameter being smaller than the second diameter,
   wherein the radially internal first boundary surface delimiting a right angle radially inside the dirt lip has a first length,
   wherein a third boundary surface of the sealing leg has a third length deviating from the first length, and
   wherein the first length is greater than the third length.

2. The sealing ring according to claim 1, wherein the dirt lip is hinged to the sealing leg by a second joint.

3. The sealing ring according to claim 2, wherein the second joint has a radially internal joint radius and a radially external joint radius, through which the dirt lip is configured to merge into the sealing leg.

4. The sealing ring according to claim 3, wherein the radially internal joint radius is greater than the radially external joint radius.

5. The sealing ring according to claim 4, wherein a ratio of radially internal joint radius to radially external joint radius is at least two.

6. The sealing ring according to claim 1, wherein the sealing leg and the dirt lip are configured to merge with each other in one piece and comprise one material comprising a rubber-elastic sealing material.

7. The sealing ring according to claim 1, wherein the radially external second boundary surface is convex along an extent thereof.

8. The sealing ring according to claim 7, further comprising:
   a tensioning element arranged on a side of the sealing leg facing away axially from the dirt lip so as to merge from the sealing leg into the first axial leg in order to stabilize the sealing leg in a radial direction.

9. The sealing ring according to claim 8, wherein the tensioning element is annular and, when viewed in cross section such that a radially outward direction extends from bottom to top, comprises a spring in a shape of a seven and has a second axial leg and a stabilizing leg, and
   wherein the second axial leg is connected to the first axial leg and the stabilizing leg is connected to the sealing leg.

10. A method, comprising:
    using the sealing ring according to claim 1 in tunnel boring machines or wind turbines.

11. The sealing ring according to claim 1, wherein a radial prestress of the sealing lip against a first machine element is greater than a radial prestress of the sealing edge against a second machine element.

\* \* \* \* \*